United States Patent

[11] 3,581,746

| [72] | Inventor | Robert A. Louks |
| | | Gilman, Iowa 50106 |
| [21] | Appl. No. | 725,871 |
| [22] | Filed | May 1, 1968 |
| [45] | Patented | June 1, 1971 |

[54] APPARATUS FOR DISTRIBUTING GRAIN TO A COMBINE CHAFFER SCREEN
9 Claims, 16 Drawing Figs.

| [52] | U.S. Cl. | 130/24, 209/254 |
| [51] | Int. Cl. | A01f 12/24 |
| [50] | Field of Search | 130/24; 209/254, 261 |

[56] References Cited
UNITED STATES PATENTS

| 2,893,558 | 7/1959 | Zollinger | 209/254 |
| 2,989,183 | 6/1961 | Zollinger | 209/254 |
| 3,108,064 | 10/1963 | Grant | 130/24X |

Primary Examiner—A. F. Guida
Attorney—Henderson & Strom

ABSTRACT: This invention relates to an apparatus for distributing grain to a combine chaffer screen, the apparatus distributing the grain across the width of the screen and including a screw auger extending transversely across the feed end of the screen, the auger being capable of axial rotation in either direction, an independent power means to rotate the auger and a swinging pendulum connected to the power means to effect rotation of the auger in either direction in response to the lateral inclination of the combine.

PATENTED JUN 1 1971 3,581,746

INVENTOR
ROBERT A. LOUKS
BY
 Robert Henderson
ATTORNEY

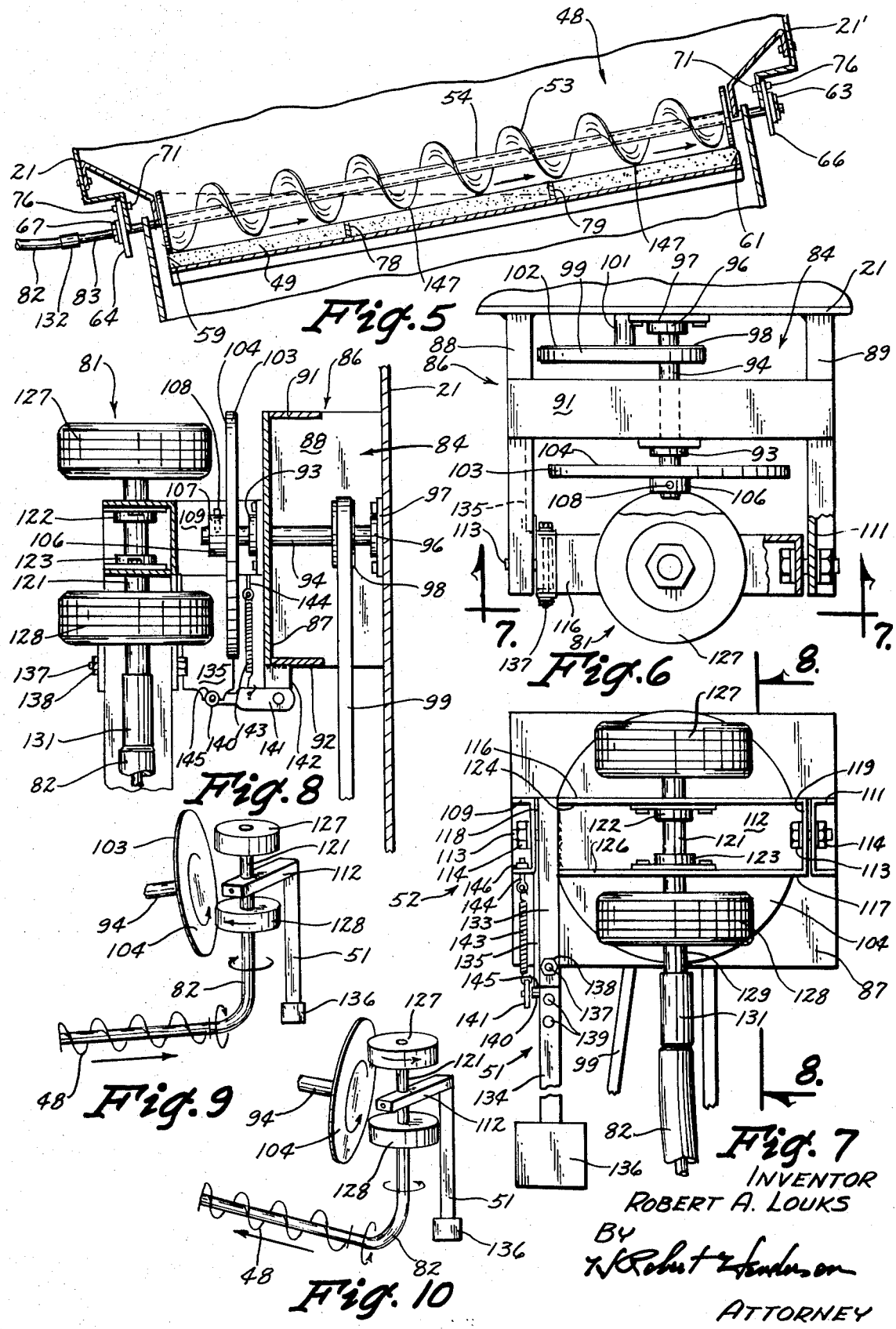

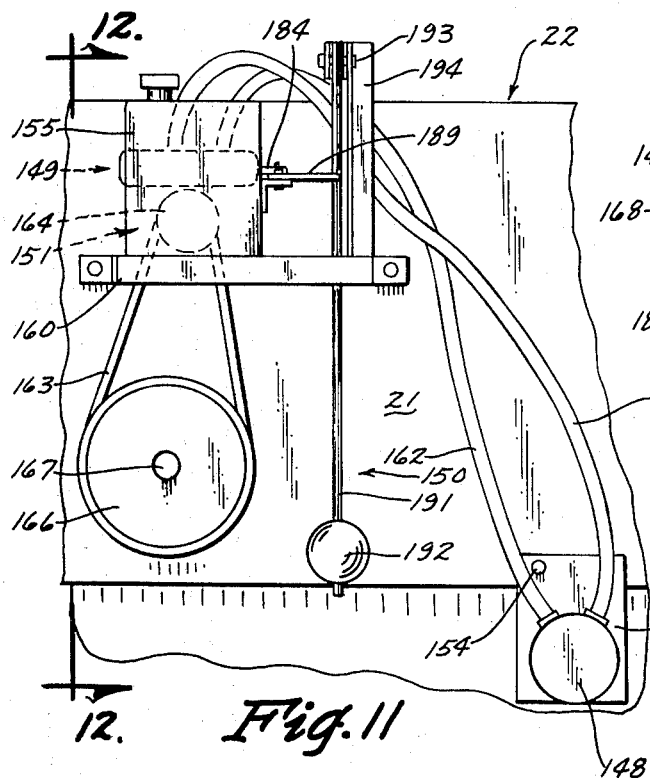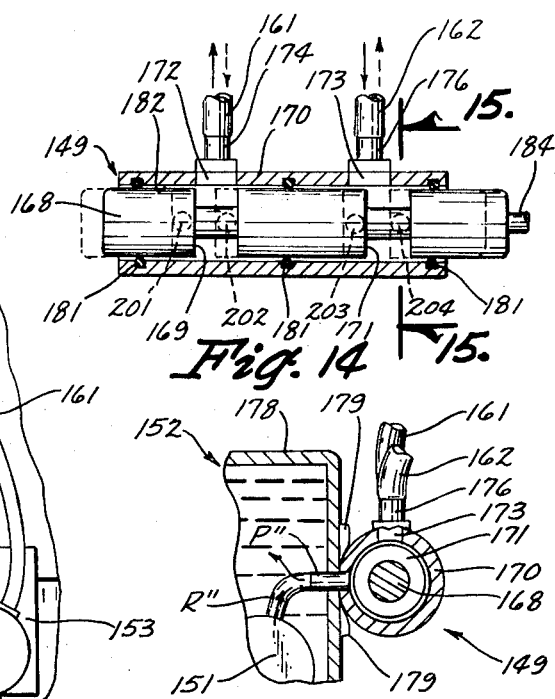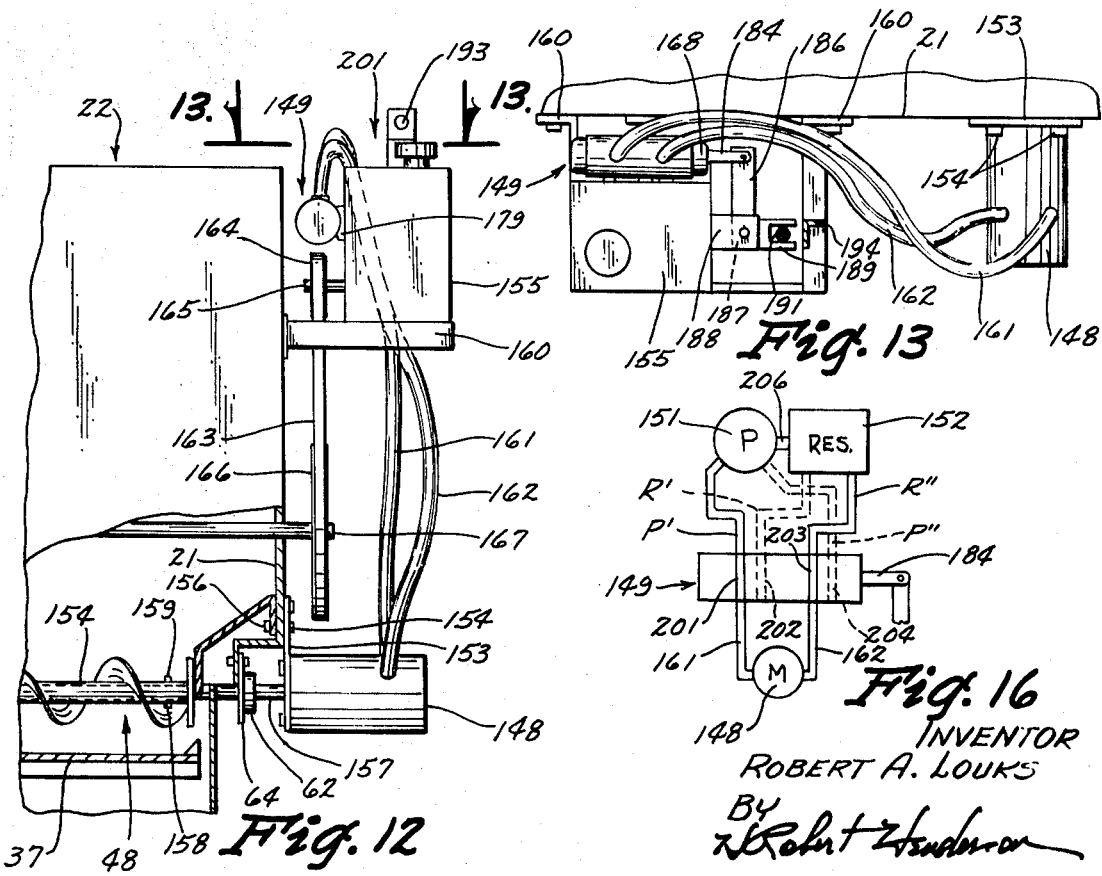

APPARATUS FOR DISTRIBUTING GRAIN TO A COMBINE CHAFFER SCREEN

BACKGROUND OF THE INVENTION

This invention relates generally to feeding collected grain to a combine chaffer screen and particularly to a novel apparatus for distributing the fed grain across the chaffer screen.

The threshing or combining process of removing the grain from the chaff encompasses a good many steps with one of the final steps being to pass separated grain from the stalk across a series of chaffing screens or sieves to finalize the removal of the grain from chaff and other foreign material. The modern combines are equipped with sieves which are quite effective in this operation when the grain is evenly spread across the screen or sieve in the capacity or thickness recommended for the sieve. A problem arises however when the combine is operated over terrain which is other than level. When the combine is tilted laterally as it is when operating on a hillside, the grain being fed to the screen piles up on the downhill side of the screen and drastically reduces the effectiveness of the screen resulting in the collected grain being polluted with unnecessary chaff and foreign material.

In order to alleviate this problem, various ways of distributing the grain across the screens have been devised including placement of a series of longitudinal baffles along the screen to retard the sliding of the grain downward to the tilt of the combine, sectioning the sieve longitudinally and maintaining each section on a horizontal plane by pendulum control, and lateral placement of air nozzles to blow streams of air upward toward the high portion of the combine. Another method is that described in U.S. Pat. No. 2,310,610 employing a pendulum controlled plate used to direct the falling collected grain to the sieve away from the downhill side of the combine.

The most positive approach has been the placement of a screw-type auger traversing the screen at the feed end of the screen to push the accumulated grain at the lower portion of the tilted combine screen upward as illustrated in U.S. Pat. Nos. 2,893,558 and 3,108,064. Each of these devices employ an auger having reverse flighting portions at each end for moving the grain toward the center of the auger and screen. The difficulty with these devices is that the collected grain is directed toward the center of the screen rather than toward the high edge of the screen and thereby taking advantage of only half of the screen. The intent of the present invention is to distribute the grain across the entire width of the screen to produce a more even distribution of the grain on the screen.

SUMMARY OF THE INVENTION

This invention relates to a device for distributing grain across a combine chaffer screen, the apparatus comprising an auger journaled transversely above the chaffer screen at the feed end of the screen, the auger having a single flighting extended the full length thereof, the auger connected to a power means capable of axially rotating the auger in either direction, the direction of rotation of the power means being determined by a pendulum attached thereto, the pendulum being responsive to the lateral inclination of the combine.

It is an object of this invention to provide an improved grain distributing apparatus for a combine chaffer screen.

It is another object of this invention to provide an apparatus for a combine chaffer screen which will effectively distribute the collected grain across the screen when the combine is operated on sloping terrain.

It is yet another object of this invention to provide a grain distributing apparatus for a combine chaffer screen which is an auger capable of reversing rotational direction relative to the direction of tilt of the combine, and which auger is capable of moving the grain from one side of the screen completely to the other side thereof.

It is still another object of this invention to provide a novel power means to independently rotate an auger.

An object of this invention is to provide a novel means to independently power an auger with a hydraulic motor and reverse the direction of rotation of the motor by employing a pendulum.

Another object of this invention is to provide a grain distributing apparatus for a combine chaffer screen which is capable of adaption to all conventional combines.

Yet another object of this invention is to provide an apparatus capable of attaining all the foregoing objects, yet is simple, economical, and rugged in construction.

These objects and other features and advantages will become readily apparent when taken in conjunction with the following description and drawings.

BRIEF DESCRIPTION OF THE DRAWINGS

FIG. 5 is a view similar to FIG. 3 showing grain on the chaffing screen being retained level, with the combine laterally inclined;

FIG. 6 is a plan view showing power means of the apparatus of this invention;

FIG. 7 is an elevational view as taken along the line 7—7 of FIG. 6;

FIG. 8 is a cross-sectional view as taken along the line 8—8 of FIG. 7;

FIG. 9 is a diagrammatic view of the power train of this invention, showing operation thereof with the combine tilted in one direction;

FIG. 10 is a diagrammatic view of the power train of this invention, operation thereof showing with the combine tilted in the opposite direction;

FIG. 11 is a side elevational view showing a modification of the apparatus of this invention;

FIG. 12 is a front elevational view of the modification of the apparatus of this invention with a section cut away for clarity of illustration;

FIG. 13 is a plan view of the power means of the modification;

FIG. 14 is a cutaway side view of the valve of the power means;

FIG. 15 is a cross-sectional view as taken along the line 15—15 of FIG. 14; and

FIG. 16 is a schematic view of the power train of the modification.

DESCRIPTION OF THE PREFERRED EMBODIMENT

Figure 1:
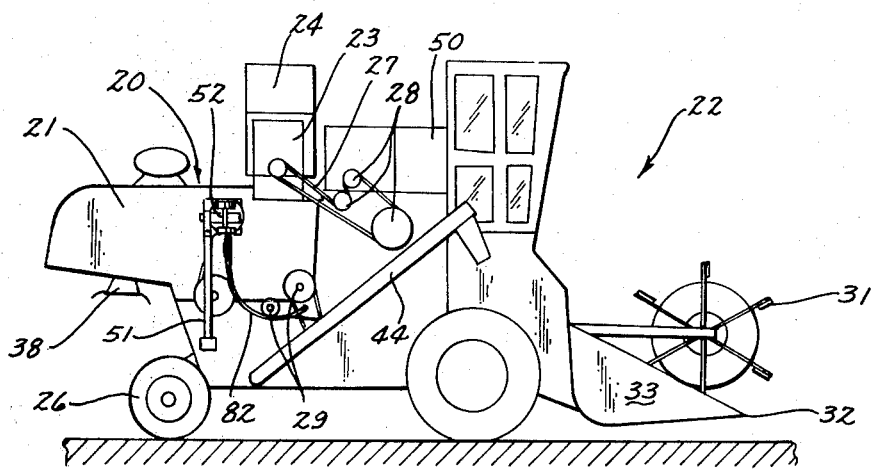
FIG. 1 is a side elevational view of a conventional combine showing the apparatus of this invention attached to the side thereof.

Referring now to the drawings and particularly FIG. 1, the apparatus of this invention is indicated generally at 20 attached to the side 21 of a conventional combine 22.

Generally, the combine 22 includes a top mounted engine 23 having a screened air intake 24 for propelling the wheel 26 mounted combine 22. In addition to propelling the combine 22, the engine 23 also powers the numerous moving internal parts by a series of belts 27 or chain driven pulleys 28 connected to rotating shafts 29.

Figure 2:
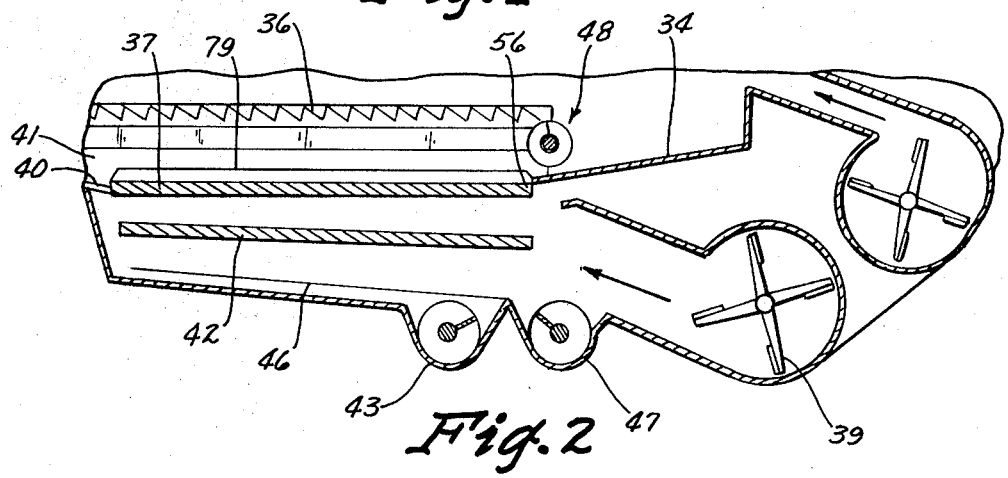
FIG. 2 is an enlarged cutaway side elevational view of the lower portion of the combine showing the chaffing screen and the position of the auger of this invention relative thereto.

In operation, the standing crop is drawn into the combine 22 by a reel 31 while being simultaneously cut by a sickle bar 32 preceding a header assembly 33. The collected crop is first subjected to an operation to remove the grain from the stalks or straw, the separated grain falling to a pan 34 (FIG. 2) while the separated straw proceeds over a straw walker 36 where any grain failing to drop to the pan 34 is collected and falls to the chaffer screen 37. The grainless straw is then voided from the combine 22 through an opening (not shown) adjacent a rotating spreader fan 38 (FIG. 1) positioned at the rear of the combine 22.

Continuing the cleaning operation, the substantially clean grain is fed from the collecting pan 34 (FIG. 2) to a chaffer screen 37 where it is subjected to the usual shaking and airblast treatment (see arrow) from a fan member 39. The lighter chaff and foreign material is voided from the combine 22 through an aperture 41 therein provided, while the heavier grain drops through openings (not shown) in the screen 37 to a second sieve 42 or chaffer screen for further shaking and airblast treatment. Any unseparated grain will work its way backward to fall through a grate 40 and drop to an augered trough 43 to be rerun through the separating process by an augered conveyor 44 (FIG. 1). The clean grain falls through the screen 42 (FIG. 2) to a plate 46 to direct it to a second augered trough 47 to be deposited in a bin 50 mounted on top of the combine 22 for ultimate removal.

Figure 3:
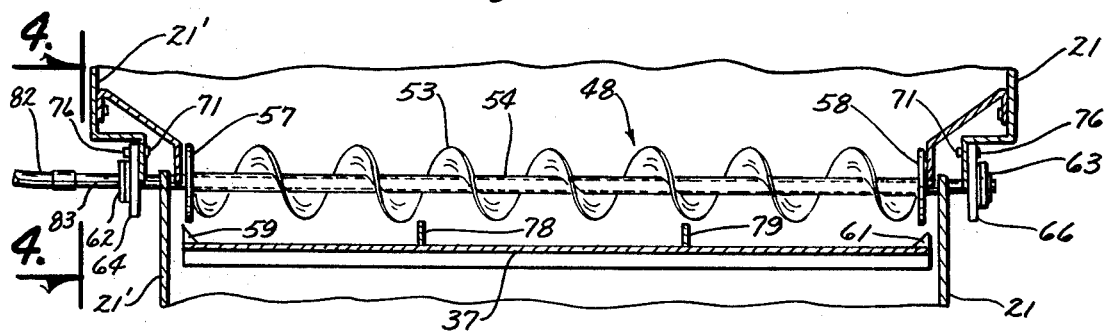
FIG. 3 is an enlarged cross-sectional view of the auger of this invention positioned relative to the combine chaffer screen looking from front to rear.

Generally the apparatus 20 of this invention comprises a screw auger 48 (FIGS. 3 and 5) for distributing grain 49 onto the chaffer screen 37 of a combine 22 (FIG. 1), and a pendulum controlled power assembly 52 for rotating the auger 48 in either direction in response to the lateral inclination of the combine 22. The pendulum is indicated at 51.

The auger 48 is a conventional screw-type auger having helical flighting 53 of a constant pitch wound about the axis of a shaft 54 with the extended edges 147 of the flighting 53 remaining a constant distance from the longitudinal axis of the auger 48 along the entire length of the auger 48. The auger 48 is positioned transversely above the feed end 56 (FIG. 2) of the chaffer screen 37. The helical flighting 53 extends the entire width of the chaffer screen 37 to permit total grain distribution across the screen 37 and terminates in a disc 57, 58 at each end of the flighting 53 to retard an overflowage of the grain 49 beyond the lateral bordered ends 59, 61 of the screen 37.

The shaft 54 of the aUger 48 extends through holes (not shown) formed in the sides 21, 21' of the combine 22 adjacent the feed end 56 of the chaffer screen 37 and is rotatably mounted in bearings 62, 63 attached to mounting member 64, 66 adjustably secured to the sides 21, 21' of the combine 22.

Figure 4:
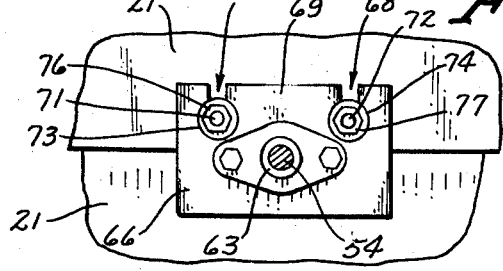
FIG. 4 is a side elevational view as taken along the line 4—4 of FIG. 3.

The mounting members 64, 66 are identical, and only one member 66 (FIG. 4) will be described. The mounting member 66 includes a substantially flat plate having a pair of parallel channels 67, 68 extending from approximately the midline of the plate through the top edge 69 of the plate. The member 66 is connected to the side 21 of the combine by a plurality of bolts 71, 72 traversing the member 66 through the channels 67, 68 respectively and connecting washers 73, 74 and nuts 76, 77.

The vertical distance between the auger 48 (FIG. 3 and 5) and the chaffer screen 37 and baffles 78, 79 attached thereto may be easily adjusted by loosening the nuts 76, 77 and vertically sliding the mounting member 64, 66 to the desired position and securing by tightening the nuts 76, 77.

The power assembly 52 (FIGS. 6—8) of the apparatus 20 of this invention generally includes a pivotal wheel assembly 81 having a flexible drive member 82 attached to an extended portion 83 (FIG. 5) of the auger shaft 54, and a rotating disc assembly 84 (FIG. 8) engageable with the wheel assembly 81 for imparting rotation thereto.

The disc assembly 84 includes a boxed housing 86 (FIGS. 6 and 8) attached to the side 21 of the combine 22 as by welding, and projecting laterally outward therefrom. The housing 86 includes a front panel 87, sides 88, 89, and a semienclosing top 91 and bottom 92.

Traversing a bearing 93 (FIG. 6) attached to the front panel 87 of the housing 86 and a bore (not shown) formed adjacent thereto is a horizontally disposed rod 94 rotatably mounted in a bearing 96 attached by a bracket 97 to the side 21 of the combine 22. A flanged pulley wheel 98 is attached to the rod 94 within the housing 86 to connect the rod 94 by a belt member 99 to a revolving shaft 101 (FIG. 6) and a pulley 102 of the combine 22, thereby providing the rod 94 continuous rotation during operation of the combine 22.

A disc 103 is connected to that portion of the rod 94 extending beyond the housing front panel 87. The disc 103 is disposed parallel to the side 21 of the combine 22, with the outer surface 104 flat, and is located on the rod 94 by a hub 106 having a threaded bore 107 for receiving a setscrew 108.

Extending laterally outward from the sides 88, 89 of the housing 86 (FIGS. 6 and 7) are a pair of braces 109, 111 for pivotally mounting a horizontal support member 112 with appropriate bolts 113 and nuts 114. The support member 112 is an open-boxed channel member having a top 116 (FIG. 7), bottom 117 and side panels 118, 119. A central hole (not shown) is formed in the side panels 118, 119 for receiving the bolts 113 to pivotally attach the support 112 to the extended braces 109, 111. A pair of axially aligned holes (not shown) are formed in the top 116 and bottom 117 panels midway between the sides 118, 119 of the support 112 for receiving an axle 121 journaled bearings 122, 123 attached to the bottom surface 124 of the top panel 117 and top surface 126 of the bottom panel 117, respectively, adjacent to the beforementioned holes formed therein.

A pair of horizontally disposed wheels 127, 128 are securely attached to the axle 121, one wheel 127 disposed above the support arm 112 and the second wheel 128 disposed below the support arm 112 and in proximity to the revolving disc 103 so as to alternatively frictionally engage the flat surface 104 of the disc 103 when the wheel support arm 112 is pivoted by the pendulum 51 hereinafter described.

A portion 129 of the axle 121 extends beyond the wheel 128 to connect with the flexible drive member 82 of wound cable, rubber tubing, or like material. The drive member 82 extends to and longitudinally connects the extended portion 83 of the auger shaft 54 as hereinbefore described. The drive member 82 connects the axle 121 and shaft 54 by appropriate couplings 131, 132.

Attached to the support arm 112, as by welding, is a pendulum 51 having a variable length arm of two channel members 133, 134 and a swinging dependent weight 136 attached to the lower member 134. The upper member 133 has a hole (not shown) formed near the longitudinal end away from the support arm 112 to connect the member 134 by a bolt 137 and nut 138. The member 134 contains a series of holes 139 to connect the first member 133 for selectively altering the length of the pendulum 51.

An arm 141 (FIG. 8) is pivotally attached to a brace 142 extending vertically from the housing 86 for controlling to a certain degree the pendulum 51. The arm 141 has a roller 140 which is engageable with a depression 145 formed in the bottom of a rigid strap member 135 attached to brace 109 whereby a slight inclination of the combine 22 to either side is insufficient to pull the pendulum structure away from the arm 141. The amount of drag transferred to the pendulum 51 by the arm 141 is determined by a spring 143 connected to the arm 141, the tension of which is variable by an eye screw 144 and nut 146 connecting the spring 143 to the brace 109.

The pendulum 51 tends to keep the axle 121 on a vertical axis during operation, and as best illustrated in FIG. 8, the wheels 127, 128 do not engage the disc 103 when the combine 22 is on level ground as the revolving disc 103 is likewise vertical. The lateral tilt of the combine 22 when operating on hilly terrain, however, causes the disc 103 (FIGS. 9 and 10) to vary from the vertical axis and thereby engage either wheel 127 or wheel 128, depending upon the direction of tilt of the combine 22.

When the combine 22 tilts away from the side 21 of the combine 22 bearing the power 52, the disc 103 tilts also to engage the bottom wheel 128 (FIG. 9) and causes rotation of the axle 121 in one direction, here illustrated as clockwise. When the combine 22 tilts toward the side 21 of the combine 22 bearing the power assembly 52, the disc tilts to engage the upper wheel 127 (FIG. 10) and causes rotation of the axle 121 in another direction, here illustrated as counterclockwise. The direction of movement of the axle 121 is imparted to the drive member 82 and which rotates the auger 48.

In operation, the combine 22 tilted toward the side 21 is illustrated in FIG. 5 together with grain 49 piled upon the chaffer screen 37, the broken line indicates the proximate position of the grain 49 in the absence of the auger 48 of this invention. The lateral inclination of the combine 22 in this position causes the axially vertical upper wheel 127 to engage the disc 103, as illustrated in FIG. 10, thus imparting to the auger 48 a counterclockwise rotation. The helical flighting 53 of the auger 48 engages the stacking grain 49 (broken lines, FIG. 5) and pushes the grain 49 upward upon the screen 37 toward opposite screen border 61. The vertical distance between the edge 147 of the auger flighting 53 and the screen 37 determine the height of the grain 49 now distributed in a level manner upon the screen 37, which height is adjustable by vertical placement of the mounting members 64, 66 as hereinbefore described.

Conversely, when the combine 22 is tilted toward the side 21', the simultaneously tilted disc 103 engages the lower wheel 128 (FIG. 9) imparting clockwise rotation to the drive member 82, and whereby rotation of the auger 48 thereby moves the grain 49 from the low side 21' to the high side 21, providing again an even distribution of the grain 49 across the screen 37.

It is recognized that reversing the counterclockwise rotation of the disc 103 would necessarily have to be compensated by likewise reversing the flighting 53 rotation upon the auger shaft 54.

A modification of the hereinbefore described apparatus 20 is illustrated in FIGS. 11 through 16 by apparatus 20', with like parts being indicated by like reference numerals. The modified apparatus 20' includes a hydraulic motor 148 (FIGS. 11 and 12) powering the auger 48, with the direction of rotation of the auger 48 being selectively determined by the position of a valve 149 which is controlled by a pendulum 150, the pendulum 150 being responsive to the lateral inclination of the combine 22. The valve 149 controls the operation of a pump 151 (FIG. 16) fluidly connected to a reservoir 152 as best shown in the hydraulic schematic of FIG. 16, and with the pump 151 and reservoir 152 both being encased in a housing 155. The housing 155 is mounted by means of a bracket 160 to the combine side 21.

The hydraulic motor 148 (FIG. 12) of this modification is a conventional motor having a plate 153 for mounting the motor 148 to the side 21 of the combine 22 with conventional bolts 154 and nuts 156. The motor 148 is mounted such that the drive shaft 157 of the motor 148 is axially aligned with the shaft 54 of the auger 48, the drive shaft 157 being inserted within the auger shaft 54 and attaching thereto by a bolt 158 and nut 159 traversing the shafts 157, 54 through a hole (not shown) radially formed therein. The motor shaft 157 is journaled in the mounting plate 64 and bearing 62 hereinbefore defined.

The hydraulic motor 148 is powered in the conventional manner in that oil from the reservoir 152 is pumped under pressure by the fluidly connected pump 151 to the motor 148 by means of a hose conduit inlet 161, whereby operation of the motor 148 causes rotation of the drive shaft 157; the oil returning by a second hose conduit outlet 162 to the oil reservoir 152. The motor 148 is rotatable in either direction with the direction of rotation being dependent upon which conduit 161, 162 serves as an oil inlet to the motor 148.

A belt 163 interconnecting a pulley 164, attached to a shaft 165 for the pump, with a pulley 166 attached to a rotating shaft 167 extending from the combine 22 serves to power the pump 151. The shaft 167 is rotated when the threshing elements of the combine 21 are operating. The valve 149 (FIG. 14) includes a casing 170 enclosing a slidably mounted plunger 168 having a pair of longitudinally spaced grooves 169, 171 as hereinafter described. The casing 170 of the valve 149 includes a pair of longitudinally spaced and aligned apertures 172, 173 formed through the casing wall, and a pair of parallel nipple tubes 174, 176 sealed to the outside periphery 177 of the casing 170 which encloses the apertures 172, 173.

The conduits 161, 162 are in turn fluidly connected to the tubes 174 and 176, respectively.

Approximately 90° arcuately from the apertures 172, 173, a second set of four apertures 201, 202, 203 and 204 (FIG. 14) are formed in the casing wall, connected to tubes P', P", and R', R". The tubes P' and P" connect apertures 201 and 204 of the valve 149 to the pump 151 for receiving fluid, and the tubes R' and R" connect the apertures 202 and 203 of the valve 149 to the reservoir 152 to transmit fluid to same. The valve 149 (FIGS. 12 and 15) is attached to the side of the casing 170 by a bracket 179.

Enclosed within the casing 170 the piston-type plunger 168 is slidably mounted in a plurality of oil sealed bearings 181 embedded in the inner peripheral wall 182 of the casing 170. The plunger grooves 169, 171 are spaced so as to constantly fluidly connect the apertures 172, 173 connected to the motor 148 in all positions of the plunger 168 relative to the casing 170.

The tubular enclosed apertures 201, 202, 203 and 204 (FIGS. 14 and 16) are aligned relative to the plunger grooves 169, 171 such that when the plunger 168 is in one position, indicated by solid lines in FIG. 14, the openings 202 and 204 are fluidly connected with the grooves and openings 172, 173 leading to the motor 148 while the openings 201 and 203 are occluded by the plunger 168. Fluid from the pump 151, through line P" (FIG. 16) and aperture 204 is transmitted through line 162 to the motor, thereby rotating the motor is one direction, i.e., counterclockwise. The fluid is returned through line 161, aperture 202 and tube R' to the reservoir 152.

Conversely, when the plunger 168 is slid into a second position (broken lines FIG. 14), in response to movement of the pendulum 150, the openings 201 and 203 are fluidly connected to the motor casing openings 172, 173 by the grooves 169, 171 while the openings 202 and 204 are occluded by the plunger 168. Thus, fluid from the pump 151 is forced through tube P', aperture 201, and line 161 to the motor 148, causing rotation of the motor 148 in another direction, i.e., clockwise, owing to the reverse flow of the oil through the conduits 161, 162 effected by the valve 149. The fluid is returned through line 162, aperture 203, and tube R" to the reservoir. The pump 151 draws fluid from the reservoir 152 through a conduit 206 (FIG. 16).

from one end of the plunger 168 (FIG. 13), and axially aligned therewith is a rod 184 which is pivotally connected to one end of an L-shaped bracket 186. The bracket 186 is pivotally connected at its elbow 187 to a brace 188 extending from the reservoir housing 178. The other end 189 of the bracket 186 is channeled to receive the arm 191 of the pendulum 150 (See also FIG. 11).

The pendulum 150 (FIG. 11) comprises a weight 192 dependent upon the arm 191, and which arm 191 is swingable toward and away from the side 21 of the combine 22 by means of a horizontally disposed pin 193 extended parallel to the plane of the side 21, and mounted in a vertical extension 194 of the bracket 160.

The bracket 186 connecting the plunger 168 to the pendulum 150 is arranged such that the pendulum arm 191 remains substantially parallel to the side 21 of the combine 22 when the combine 22 is moving upon level terrain or is inclined toward the side 21' away from the pendulum 150, the plunger 168 thereby remaining in a position to impart a clockwise rotation to the drive shaft 157 of the motor 148 and to the auger 48. When the combine 22 is inclined toward the pendulum side 21 of the combine 22, the arcuately pivotal pendulum 150 tends to draw the L-shaped bracket 186 away from the combine side 21 sliding the plunger 168 forward toward the pendulum 150 and thereby changing the tubular opening P', P", R' and R" alignment of the openings 201—204 with the plunger grooves 169, 171 causing rotation of the motor drive shaft 157 and auger 48 to reverse the direction of rotation to a counterclockwise movement.

In operation, the hydraulic motor 148 constantly rotates the augered grain distributor 48 in a clockwise direction when the combine 22 is operated on level terrain or is inclined toward the side 21', and when the combine 22 is inclined toward the pendulum 150 attached side 21 of the combine 22, a reversal of the drive shaft 157 occurs and auger 48 rotates counterclockwise.

As in the first embodiment, the counterclockwise rotation of the auger 48 tends to push and distribute the grain 49 (FIG. 5) from left to right upon the screen 37, wherein clockwise rotation tends to pull and distribute the grain 49 from right to left upon the screen 37, and thereby evenly distribute the grain 49 upon the whole screen 37 during both level and hillside operations, permitting maximum efficiency of the chaffing screen 37 grain cleaning process.

Although the preferred embodiment and one modification thereto have been described, it is to be remembered that variations and modifications may be made without departing from the true spirit and scope of the invention as defined in the appended claims.

I claim:

1. In a combine having a chaffing screen extending transversely of the combine, an apparatus for evenly distributing the collected grain on the screen comprising:

means rotatably mounted above the feed end of the screen and extended transversely thereover to push grain in contact therewith toward either side of the screen, wherein said grain pushing means comprises a single elongated shaft having a grain contacting member attached thereto for moving the grain to one end of the screen upon rotation of said shaft in one direction, and for moving the grain to the other end of the screen upon rotation of said shaft in a reversed direction;

power means operable in one position to rotate said shaft in one direction and in a second position to rotate said shaft in a reverse direction; and means operably connected to said power means for initiating the position shift of said power means in response to lateral inclination of the combine.

2. An apparatus for evenly distributing the collected grain on a chaffing screen as defined in claim 1, wherein said grain pushing means is vertically adjustable above the screen.

3. An apparatus for evenly distributing the collected grain on a chaffing screen as defined in claim 1, wherein said grain contacting member is a helical flighting of a constant pitch wound about the longitudinal axis of said shaft and integral therewith, the extended edges of said flighting being uniformly spaced along the entire length of said flighting from said longitudinal axis.

4. An apparatus for evenly distributing the collected grain on a chaffing screen as defined in claim 1, wherein said shift means includes a pendulum pivotally mounted to swing toward and away from the side of the combine in response to the lateral inclination of the combine.

5. An apparatus for evenly distributing the collected grain on a chaffing screen as defined in claim 4, wherein said pendulum comprises an arm and weight attached thereto, the length of said arm being selectively adjustable.

6. An apparatus for evenly distributing the collected grain on a chaffing screen as defined in claim 1, and wherein said power means includes a unidirectionally rotating disc and a pair of axially aligned, horizontally disposed wheels positioned adjacent one face of said disc, said wheels secured to an axle rotatably mounted on a support member mounted for pivotal movement about a horizontal axis, said wheels being selectively engageable with said disc face at diametrically opposite portions thereof, and a flexible drive member secured at one end to said axle and at the opposite end to said grain pushing means.

7. An apparatus for evenly distributing the collected grain on a chaffing screen as defined in claim 6, and wherein one of said wheels engages the upper portion of said disc face when the support member is pivoted in one direction and the second of said wheels engages the lower portion of said disc face when the support member is pivoted in the opposite direction.

8. An apparatus for evenly distributing the collected grain on a chaffing screen as defined in claim 1, and wherein said power means includes a reversible hydraulic motor having a drive shaft operably connected to said grain pushing means, and includes further a fluid connected pump and reservoir fluidly connected with said motor for supplying fluid thereto, and a valve unit disposed between said pump and said motor, said valve unit operably connected to said shift means and operable in one position to effect rotation of said motor drive shaft in one direction, and in a second position to effect rotation of said motor drive shaft in the opposite direction.

9. An apparatus for evenly distributing the collected grain on a chaffing screen as defined in claim 8, and wherein said valve unit includes a housing having a pair of passageways fluidly connected to said motor, and two sets of input and outlet openings fluidly connected to said pump and reservoir, a plunger slidably mounted within said housing and having a pair of axially spaced grooves, said plunger movable by said shift means from one position registering one set of said input and outlet openings with said passageways to another position registering the other set of input and outlet openings with said passageways for effecting rotation of said motor in opposite directions.